United States Patent
Block et al.

(10) Patent No.: US 7,013,233 B2
(45) Date of Patent: Mar. 14, 2006

(54) METHOD AND DEVICE FOR THE DETECTION OF THE MOVEMENT OF AN ELEMENT

(75) Inventors: Ruediger Block, Korntal-Muenchingen (DE); Christelle Andriot, Korntal-Muenchingen (DE); Rasmus Rettig, Gerlingen (DE); Klaus Walter, Bietigheim-Bissingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/495,180

(22) PCT Filed: Mar. 20, 2003

(86) PCT No.: PCT/DE03/00923

§ 371 (c)(1),
(2), (4) Date: May 11, 2004

(87) PCT Pub. No.: WO03/100352

PCT Pub. Date: Dec. 4, 2003

(65) Prior Publication Data

US 2005/0024042 A1    Feb. 3, 2005

(30) Foreign Application Priority Data

May 25, 2002    (DE) ................. 102 23 358

(51) Int. Cl.
*G06F 19/00* (2006.01)

(52) U.S. Cl. ............... 702/150; 702/151; 702/56

(58) Field of Classification Search ............ 702/56
See application file for complete search history.

(56) References Cited

U.S. PATENT DOCUMENTS

| 5,202,842 A | | 4/1993 | Suzuki |
| 5,253,531 A | * | 10/1993 | Walker et al. ............ 73/650 |
| 5,451,891 A | | 9/1995 | Tanabe |
| 5,541,859 A | * | 7/1996 | Inoue et al. ............ 702/148 |
| 2002/0019710 A1 | * | 2/2002 | Henry et al. ............ 702/45 |

FOREIGN PATENT DOCUMENTS

| DE | 198 23 089 A | 12/1998 |
| DE | 197 50 304 A1 | 5/1999 |

* cited by examiner

*Primary Examiner*—David M. Gray
*Assistant Examiner*—Jonathan Moffat
(74) *Attorney, Agent, or Firm*—Michael J. Striker

(57) ABSTRACT

The invention proposes a method for detecting the motion of an element relative to a sensor device, in which signals (7 to 15) are evaluated as a function of a pulse generator (1) that is moved past the sensor (3, 4, 5). The signals (7, 8; 10, 11; 13, 14) of two sensor elements (4, 5) disposed next to each other in the movement direction are detected, wherein in order to detect vibrations perpendicular to the movement direction, the phase responses of the signals (7, 8; 10, 11; 13, 14) of the individual sensor elements (4, 5) and of the differential signals (9; 12; 15) of the individual sensor elements (4, 5) are evaluated as to whether all three signals are in phase.

8 Claims, 2 Drawing Sheets

METHOD AND DEVICE FOR THE DETECTION OF THE MOVEMENT OF AN ELEMENT

BACKGROUND OF THE INVENTION

The invention relates to a method and a device for detecting the motion of an element relative to a sensor device, in particular for sensory detection of the rotation angle of a rotating element.

Sensory devices are of this kind are already in use in a variety of embodiment forms, for example in vehicles. For example, with so-called Hall elements as rotation sensors in the wheels for an antilock brake system (ABS), as speed and phase transmitters for motor control, as speed sensors for transmission control, or as steering angle sensors for so-called electronic stability program systems and for electric power steering units. As a rule, sensor devices of this kind, for example known from DE 197 50 304 A1 emit digital signals, e.g. switching edges, as a function a transmitter wheel rotating in front of the sensor.

The essential requirements of these speed sensors in ABS and in the motor and transmission fields include the greatest possible air gap and a high degree of immunity from vibrations. These sensor devices are often expected to meet a series of sometimes conflicting requirements; a highly sensitive sensor is intrinsically also highly sensitive to excitation by vibrations, which leads to distortion of the measurement result. The full functionality in this case on the one hand, calls for very large air gaps, i.e. a very sensitive sensor, and on the other hand, calls for small air gaps so that when there is a large sensor signal, no erroneous signals can occur due to vibrations.

In order to minimize the sensitivity of such sensor devices to vibrations, a variable hysteresis is often used in conventional rotation sensors. In this connection, first the signal amplitude must be measured and then the hysteresis must be flexibly adapted to it. For large input signals, a large hysteresis is selected and for small input signals, a correspondingly reduced hysteresis is selected, i.e. when there is a small air gap, the amplitude required for switching is increased.

A significant disadvantage of this method is the loss of the immunity to air gap impacts during operation that can temporarily result in a significant reduction of the signal amplitude. A previously increased hysteresis at the switching point of the sensor can result in signal loss in the event of an air gap impact.

In addition, this method can be used only after executing a calibration of the sensor since the signal amplitude is known only after calibration. The vibration sensitivity continues to exist directly after the sensor is switched on.

For example, U.S. Pat. No. 5,451,891 A1 has disclosed the use of an adaptive hysteresis that is dependent on signal amplitude. In this instance, a coupling factor is ascertained as the quotient of the measured sensor amplitude and the frequency and, based on this coupling factor, the hysteresis is set proportional to the product of the coupling factor and the frequency. This known method can be used only to compensate for the behavior of passive sensors that supply a very small signal for low excitation frequencies and emit a very large amplitude for high frequencies. It is not possible, however, to improve the behavior of sensors that supply a constant internal signal amplitude, independent of the signal frequency.

SUMMARY OF THE INVENTION

The invention relates to a modification of a method mentioned at the beginning, which is for detecting the motion of an element relative to a sensor device in which signals are evaluated as a function of a pulse generator that is moved past the sensor. The invention proposes advantageously evaluating the signals of two sensor elements situated next to each other in the movement direction. This makes it easily possible to detect a radial vibration, for example when sensing the rotation of a transmitter wheel that functions as a pulse generator. One such sensor device can, for example, be used as a speed sensor in a motor vehicle.

The phase responses of the signals of the individual sensor elements and of the differential signal of the individual sensor elements are advantageously evaluated as to whether a phase change in the same direction is occurring in all three of the measured signals in order to detect vibrations perpendicular to the movement direction, i.e. for example oscillation in the distance between the transmitter wheel and the sensor elements.

Preferably, the evaluation of the signals occurs in such a way that the respective zero crossings, possibly after an offset correction, and the slopes in the zero crossings are determined and if all three signals have simultaneous zero crossings and slopes with the same sign, then a vibration of the pulse generator is detected. If a radial vibration is detected, then the output signal of the sensor circuit can be suppressed in a simple manner.

An advantageous sensor device for executing the above-described method has at least two contactless sensors in the form of Hall elements or magnetoresistive elements. It is then possible to provide a phase detection circuit with an input for the signals of the sensor elements and an input for the differential signal based on the at least two sensor signals.

It is also advantageous for the output of the sensor device to have a vibration control circuit connected before it, which has inputs for the output of the phase detection circuit and for a signal preparation and comparator circuit that is triggered by the differential signal. This permits definite suppression of the above-described vibrations in the sensor device without impairing the sensor behavior, particularly under limit conditions.

A sensor device that functions according to the invention can readily be provided in the usual way with so-called differential Hall sensors. The method according to the invention is advantageously suitable for distinguishing vibrations in the sensor device from a correct stimulation of the sensor elements and is essentially based on the use of a differential sensor principle, i.e. on the use of at least two sensor elements. It can be used with different sensor types, such as the above-mentioned Hall elements or magnetoresistive elements such as so-called AMR or GMR elements, as well as with optical speed sensors. This allows a speed sensor to easily evaluate radial oscillation or vibrations between the transmitter wheel and the sensor elements.

BRIEF DESCRIPTION OF THE DRAWINGS

An exemplary embodiment of the invention for detecting the motion of an element relative to a sensor device will be explained in conjunction with the drawings.

DETAILED DESCRIPTION OF THE PREFERRED EMBODIMENTS

Figure 1:
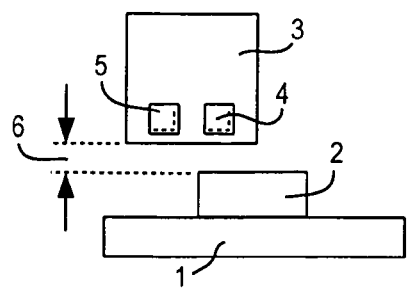
FIG. 1 shows a partial region of a transmitter wheel that serves as a pulse generator of a speed sensor and, situated opposite from it, contactless sensor elements of the sensor device.

FIG. 1 shows a region of a transmitter wheel 1 of a speed sensor, which has teeth 2 for producing switching pulses in a sensor circuit 3 during a rotation of the transmitter wheel 1 and therefore a movement past the sensor circuit 3. The sensor circuit 3 here has two contactless sensor elements 4 and 5, for example Hall elements, disposed opposite from the transmitter wheel 1. In addition, an arrow 6 here indicates a radial vibration to be detected and evaluated by the sensor device according to the invention.

Figure 2:
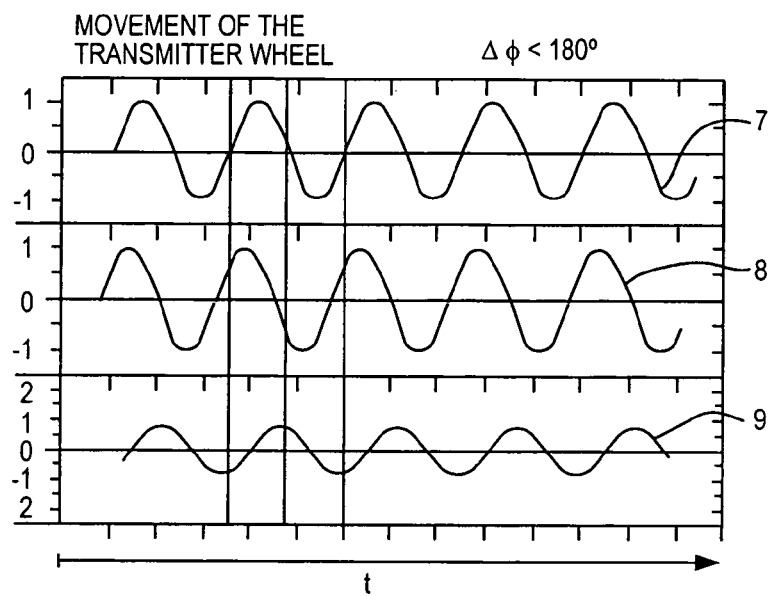
FIG. 2 is a graph of the course of the output signals of the sensor elements and of a differential signal based on them.
Figure 3:
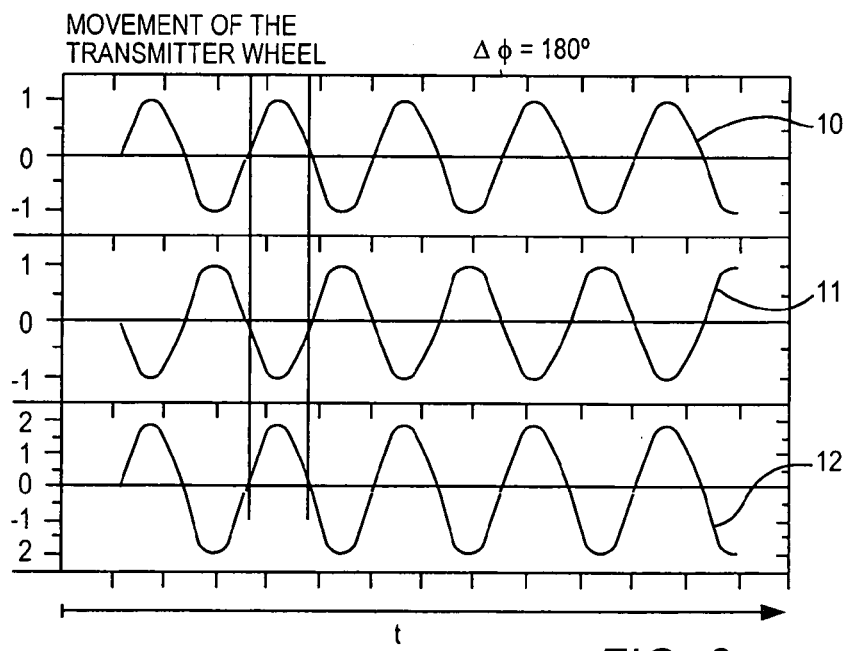
FIG. 3 is a graph that, in a modification of the course according to FIG. 1, has a phase shift of 180° between the sensor elements.

FIG. 2 is a graph of a course 7 of a signal of the sensor element 4 and a course 8 of a signal of the sensor element 5 during a correct rotation of the transmitter wheel 1 without vibrations, plotted over time t. The reference numeral 9 indicates a differential signal based on the signal courses 7 and 8. FIG. 3 gives a comparable depiction of signal courses 10, 11, and 12 in which the signal courses 10 and 11 have a greater phase difference, in this case 180°.

Figure 4:
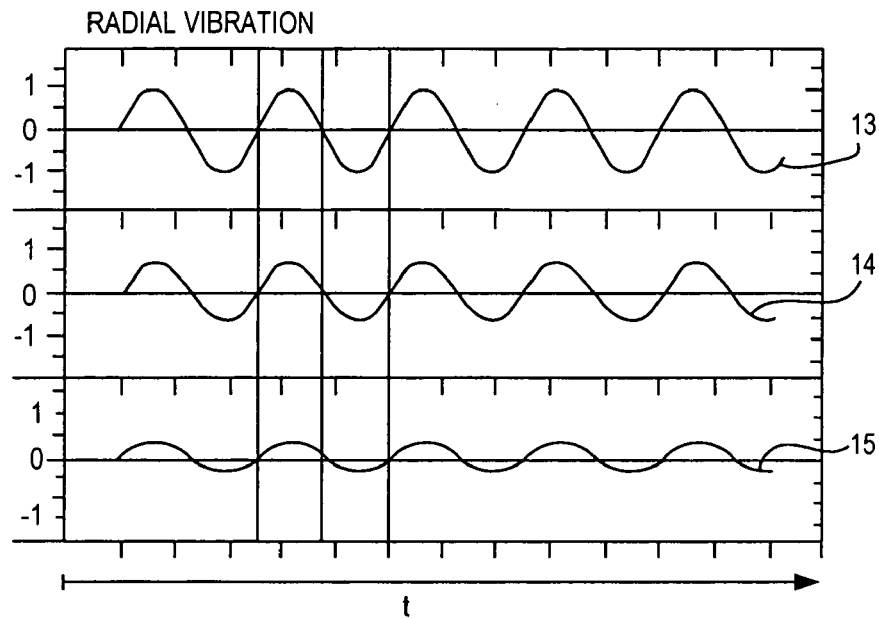
FIG. 4 is a graph of the course of the signals of the sensor elements when there is a radial vibration.

By contrast to FIGS. 2 and 3, FIG. 4 shows the behavior of signal courses 13, 14, and 15 of the sensor elements 4 and 5 that occur in the event of a vibration in the distance between the transmitter wheel 1 and the sensor elements 4 and 5, which vibration is indicated by the arrow 6 in FIG. 1.

The graphs according to FIGS. 2 to 4 demonstrate that determining the phase shifts between the signal courses of the sensor elements 4 and 5 makes it possible to detect radial vibrations. FIGS. 2 and 3, in particular, show that with a correct rotation of the transmitter wheel 1, a rotation-dependent phase shift occurs between at least two of the associated signal courses 7, 8, 9 or 10, 11, 12. But if the phase relation between the respective signal courses is zero and therefore all of the signals are in phase, as can be seen from courses 13, 14, and 15 in FIG. 4, then a radial vibration is detected and the output of the sensor device could consequently be switched off until a phase shift was once again measurable. Analogous to FIGS. 2 and 3 (courses 9 and 12), the signal 15 in this case represents the differential signal based on the signal courses 13 and 14.

Figure 5:
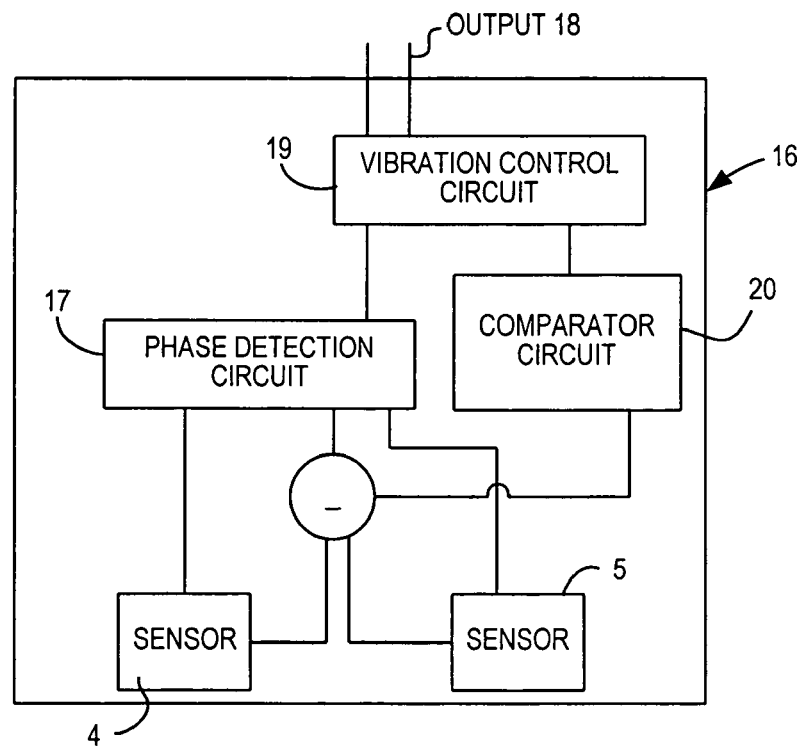
FIG. 5 is a block circuit diagram of an evaluation circuit for the signals of the sensor elements.

The design of a sensor device for executing the above-described method is shown in FIG. 5 in the form of a block circuit diagram of an evaluation circuit 16 for evaluating the signal courses of the sensor elements 4 and 5. This evaluation can be executed here in such a way that the zero crossings are determined first for the two sensor elements 4 and 5 and then for their differential signal, possibly after an offset correction in a phase detection circuit 17.

The slope for all three signals here is also determined at the zero crossing. If in the first place, all three signals (see signal courses 13, 14, and 15 in FIG. 4) pass through zero simultaneously, and in the second place, the slopes all have the same sign, then the three signals are in phase and therefore a disruptive vibration is occurring. The signal at the output 18 of the evaluation circuit 16 can then be suppressed by a vibration control circuit 19; the vibration control circuit 19 is supplied with the output signal of the phase detection circuit 17 and the output signal of a signal preparation and comparator circuit 20 for the differential signal.

What is claimed is:

1. A method for detecting the motion of an element relative to a sensor device, in which
signals (7 to 15) are evaluated as a function of a pulse generator (1) that is moved past the sensor (3, 4, 5), characterized in that
the signals (7, 8; 10, 11; 13, 14) of two sensor elements (4, 5) disposed next to each other in the movement direction are evaluated, wherein in order to detect vibrations perpendicular to the movement direction, the phase responses of the signals (7, 8; 10, 11; 13, 14) of the individual sensor elements (4, 5) and of the differential signals (9; 12; 15) of the individual sensor elements (4, 5) are evaluated as to whether there is a phase shift in the same direction for all three measured signals (7 to 15).

2. The method according to claim 1, characterized in that the signals (7 to 15) are evaluated in such a way that the respective zero crossings and slopes at the zero crossings are determined, and that
if all three signals (7 to 15) have simultaneous zero crossings and slopes with the same sign, then a vibration (6) of the pulse generator (1) is detected.

3. The method according to claim 2, characterized in that an offset correction is executed during detection of the zero crossings.

4. The method according to one of claims 1 to 3, characterized in that
if a radial vibration (6) is detected, then the output signal of the sensor evaluation circuit (16) is suppressed.

5. The method according to one of the preceding claims, characterized in that
a radial vibration (6) can be detected during the sensing of the rotation of a transmitter wheel (1) that functions as a pulse generator of a rotating element.

6. A sensor device for executing a method according to one of the preceding claims, characterized in that
the sensor device (3) has two contactless sensors (4, 5) with Hall elements or magnetoresistive elements and that
a phase detection circuit (17) is provided, which has an input for the signals (7, 8; 10, 11; 13, 14) of the sensor elements (4, 5) and an input for the differential signal (9; 12; 15) based on the two sensor signals (7, 8; 10, 11; 13, 14).

7. The sensor device according to claim 6, characterized in that
a vibration control circuit (19) is connected before the output (18) of the sensor evaluation circuit (17) and has inputs for the output of the phase detection circuit (17) and for a signal preparation and comparator circuit (20) that is triggered by the differential signal.

8. The sensor device according to one of claims 5 to 7, characterized in that
the sensor device is used as a speed sensor in a motor vehicle.

* * * * *